(12) United States Patent
Heppes et al.

(10) Patent No.: US 6,193,024 B1
(45) Date of Patent: Feb. 27, 2001

(54) DAMPING PLATE

(75) Inventors: Peter Heppes, Bretzfeld; Hans-Herbert Noack, Zweiflingen; Karsten Weichsel, Pfedelbach, all of (DE)

(73) Assignee: Eagle-Picher Wolverine GmbH, Ohringen (DE)

( * ) Notice: Subject to any disclaimer, the term of this patent is extended or adjusted under 35 U.S.C. 154(b) by 0 days.

(21) Appl. No.: 09/216,253

(22) Filed: Dec. 17, 1998

(30) Foreign Application Priority Data

Dec. 18, 1997 (DE) ................................ 197 56 553

(51) Int. Cl.⁷ ............................................... F16D 65/00
(52) U.S. Cl. ................... 188/73.1; 188/73.37; 192/109 B
(58) Field of Search ..................... 188/73.1, 73.37, 188/73.2, 218 A, 250 B, 250 E, 250 G, 250 A; 192/109 B

(56) References Cited

U.S. PATENT DOCUMENTS

| | | | |
|---|---|---|---|
| 3,851,724 | * 12/1974 | Banks | 188/336 |
| 5,407,034 | * 4/1995 | Vydra | 188/73.37 |
| 5,538,104 | 7/1996 | Katz et al. | 188/73 |

* cited by examiner

*Primary Examiner*—Christopher P. Schwartz
*Assistant Examiner*—C. Bartz
(74) *Attorney, Agent, or Firm*—Allen, Dyer, Doppelt, Milbrath & Gilchrist, P.A.

(57) ABSTRACT

A damping plate consists of at least one metal plate and has a pressure-transferring surface that applies offset pressure to a damping plate. The pressure-transferring surface has at least two areas with different degrees of resilience, and it can be placed at least in sections on a pressure-applying unit starting at least at a set pressure distributed over the entire pressure surface.

18 Claims, 9 Drawing Sheets

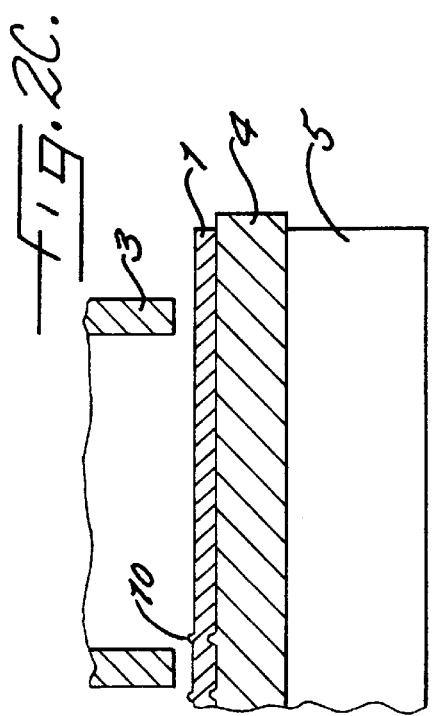
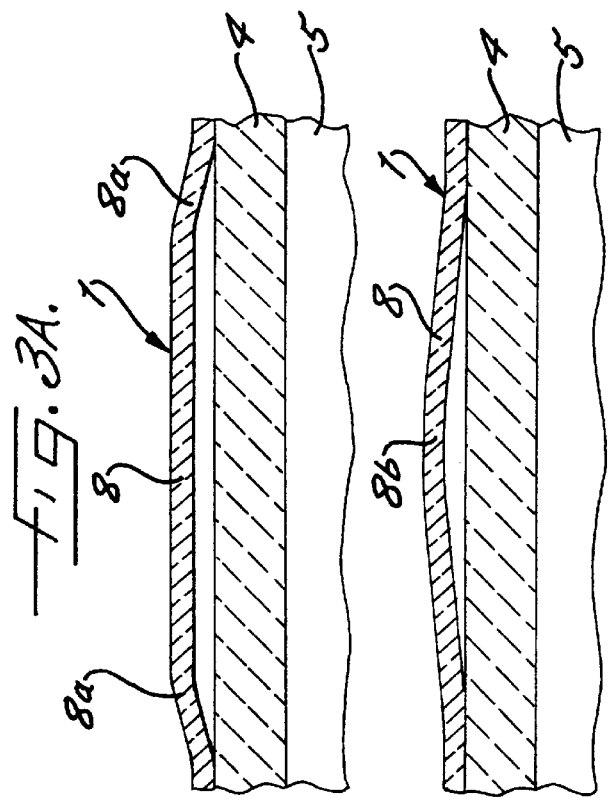
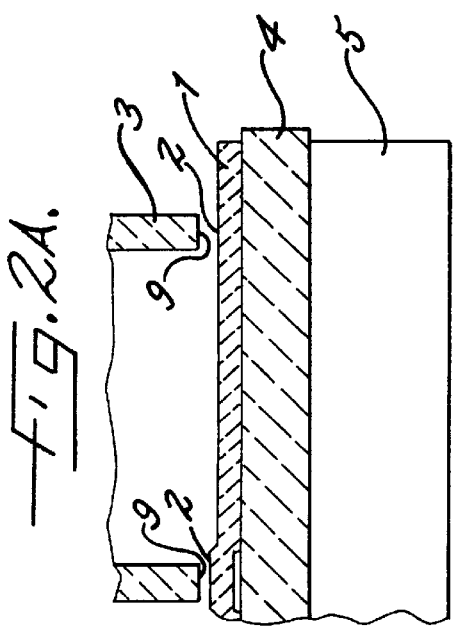
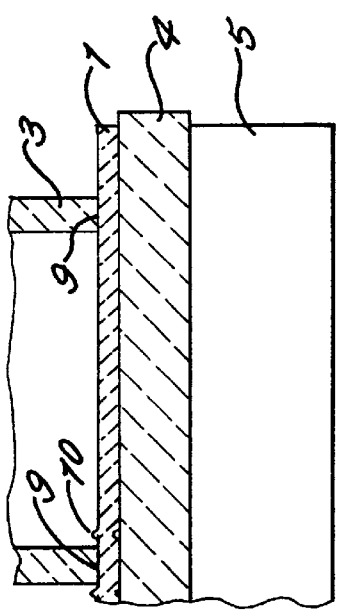

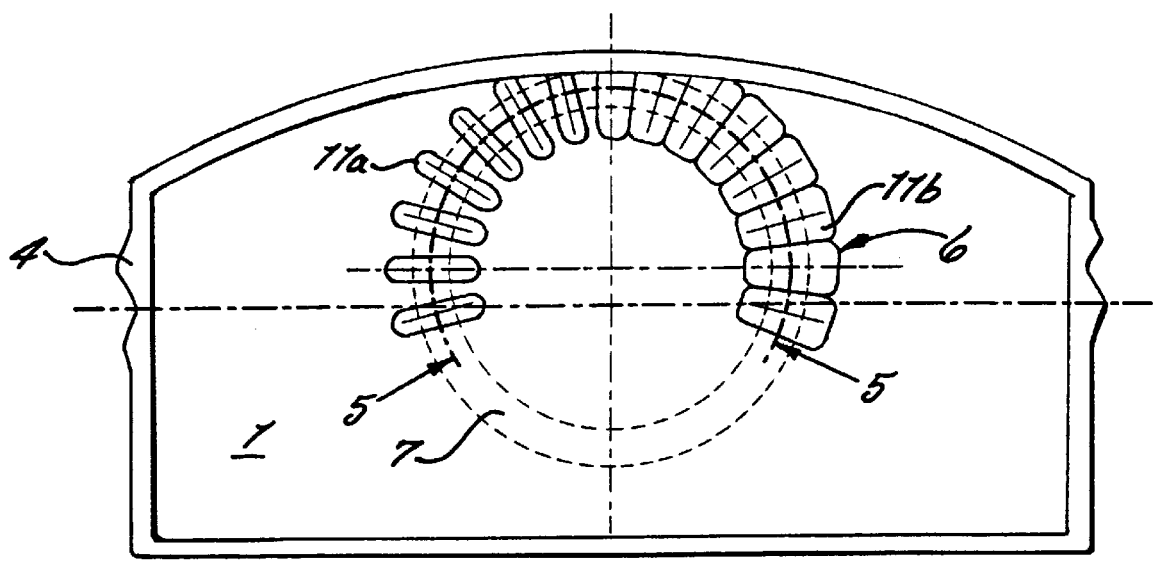
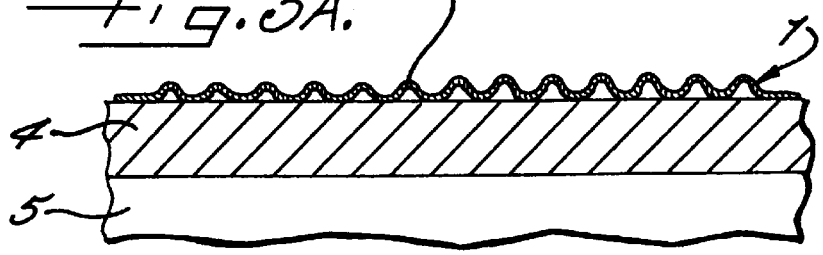
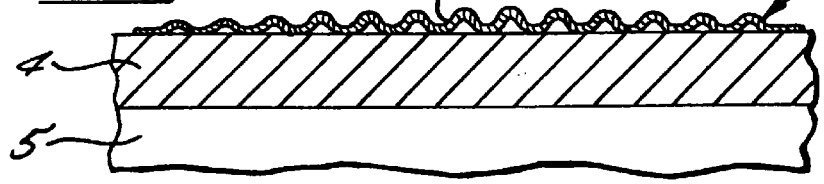

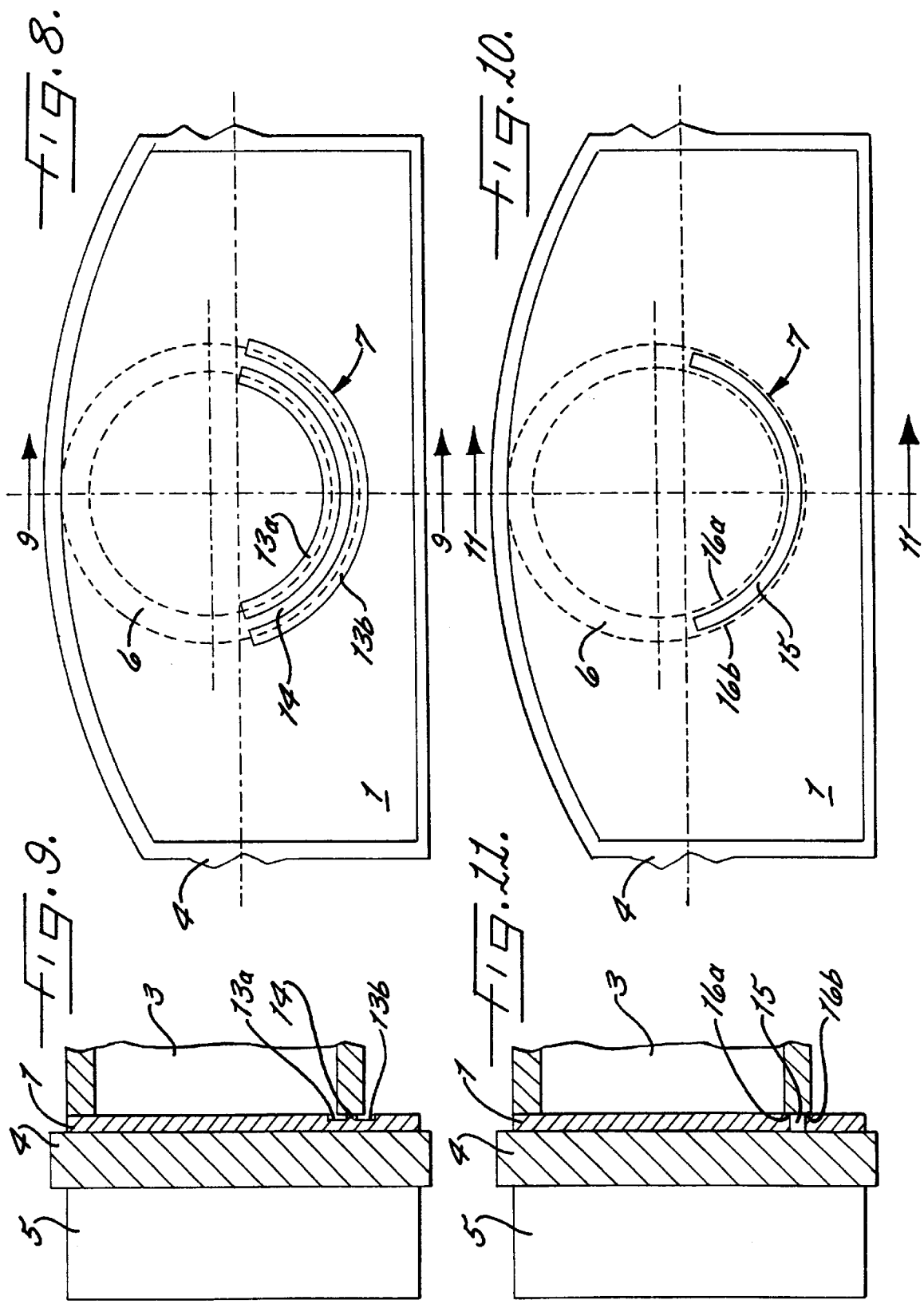

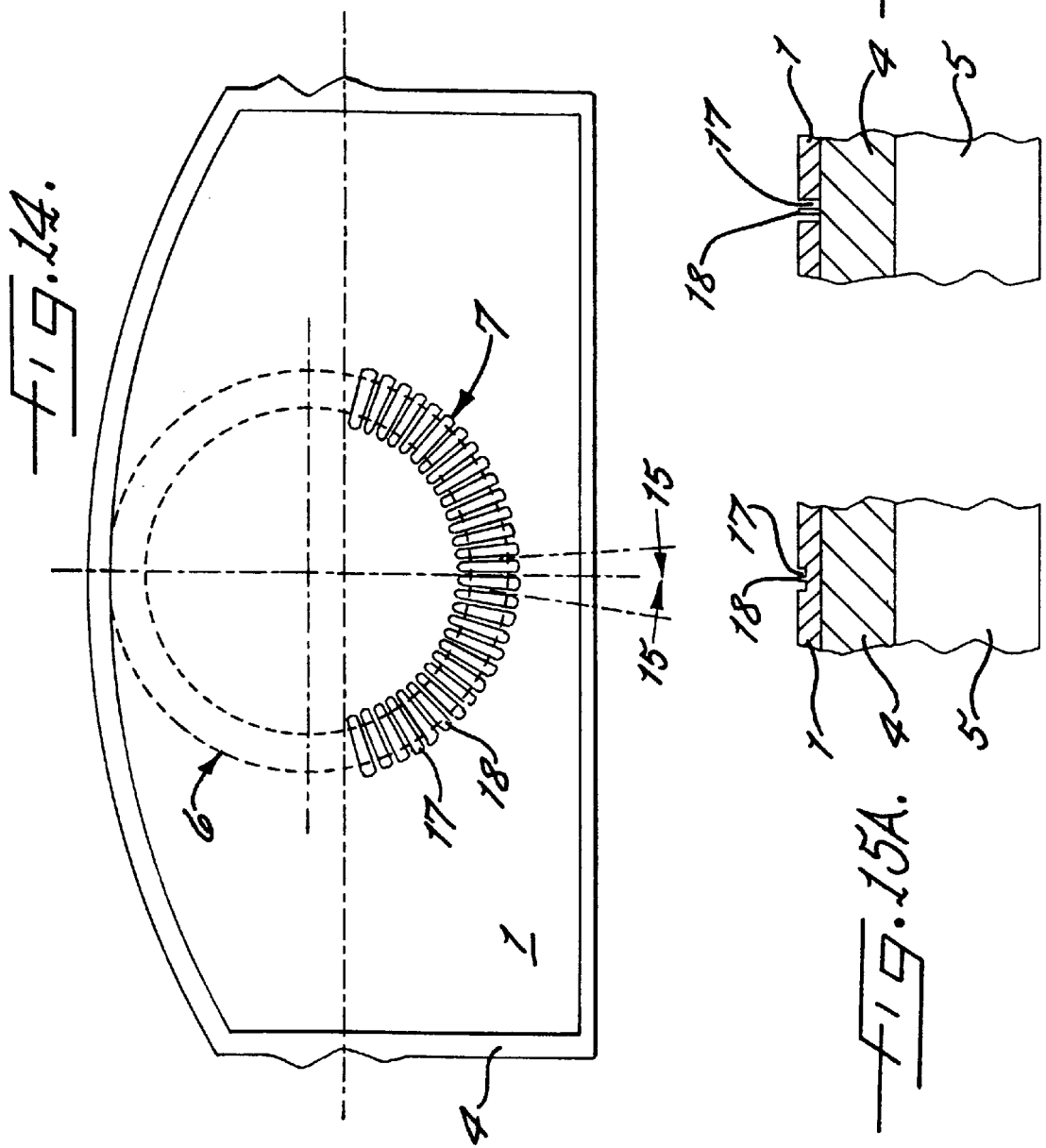

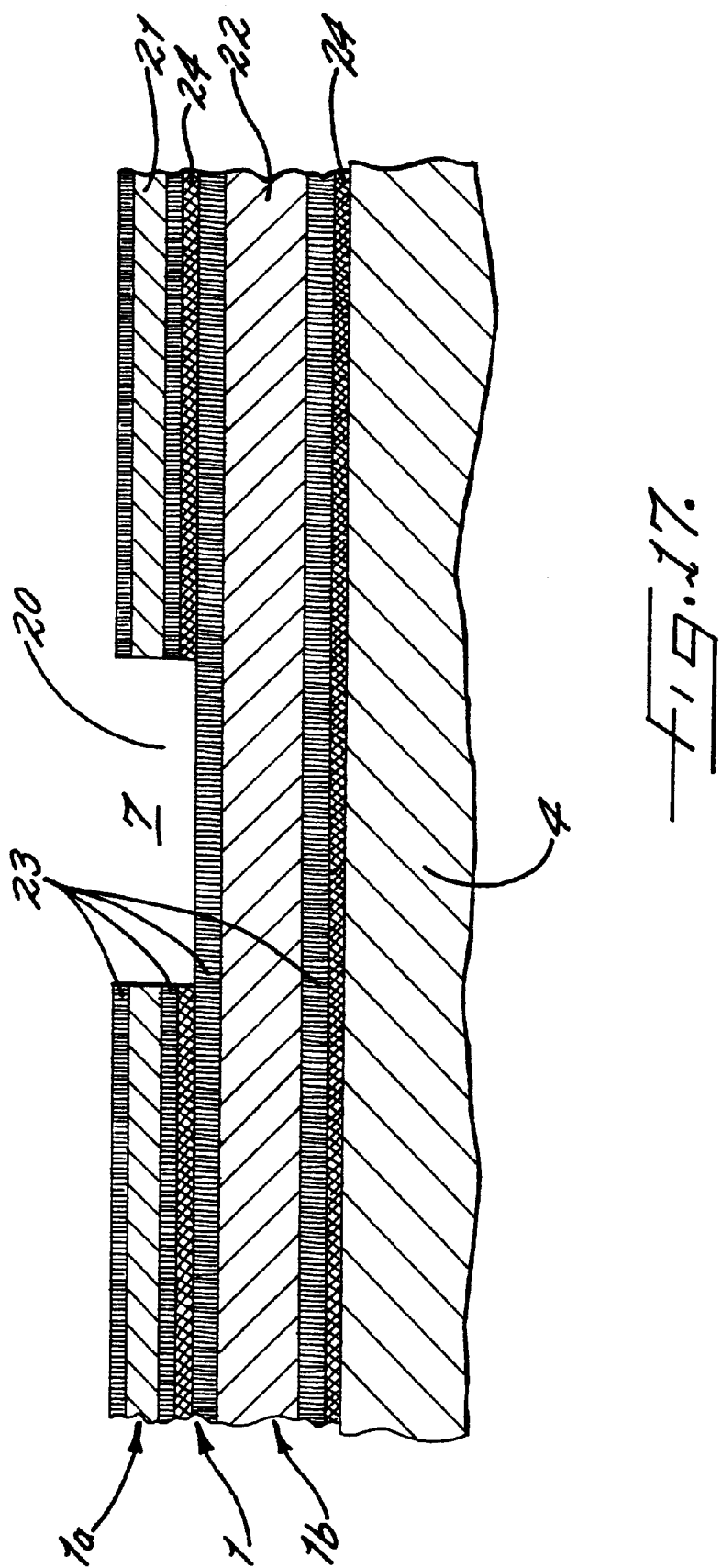

DAMPING PLATE

FIELD OF INVENTION

The invention concerns a damping plate, especially for vehicle brakes, that is made of at least one plate of metal and a pressure-transferring surface that transfers offset the pressure applied to the damping plate.

BACKGROUND OF INVENTION

Damping plates are in brakes, especially in vehicle brakes, to avoid the transfer of vibration between components and to dampen the transfer of noise. The damping plate is attached to the base plate of the brake lining on the side opposite the brake lining and conducts pressure applied from the brake piston or the caliper, in the case of floating caliper brakes, through the base plate to the brake lining. The damping plate optimally fulfills its function when the pressure applied by the brake piston or caliper is applied evenly on the brake lining, i.e., between the brake lining and the damping plate. Design requirements, however, frequently force the piston or caliper to not apply the pressure at the center of gravity of the brake lining. This results in uneven pressure on the brake lining. To counteract this, it is prior art to provide the damping plate with a crescent-shaped cut-out in the area at which pressure is transferred so that the pressure-applying surface of the piston/caliper only partially rests on the damping plate, and the pressure point displacement can be correspondingly adjusted to the requirements. It is also prior art to place a ledge in the side of the piston facing the damping plate so that the piston does not provide contact over its entire surface, and the pressure point is displaced.

With these prior art solutions, locally excessive pressure arises at the ends of the crescent-shaped cut-out or the ledge in the piston or caliper. Rubber coatings on the damping plate abrade quickly, and the damping plate is destroyed. In addition, it has been determined with floating caliper brakes that the piston and caliper assume a relatively strong angle and can partially lift from the damping plate which increases the load on the damping plate and brake lining and increases wear. For this reason, the precision in displacing the pressure point leaves something to be desired in the prior art solutions. The wear is particularly increased when the piston/caliper comes through the cut-out to directly rest on the base plate. In this case, the actual function of the damping plate is eliminated.

SUMMARY OF INVENTION

The present invention is directed to improving a generic damping plate to reduce wear and increase the precision in displacing the pressure point. In addition, continuous operability of the damping plate is guaranteed.

A damping plate according to the present invention includes a pressure-transferring surface which has at least two areas with different resilience, and a pressure-applying unit applying the pressure distributed over the entire pressure surface can be placed at least in sections on the pressure-transferring surface at least starting at a certain pressure.

With the measures according to the invention, the life of the damping plates is substantially increased, and noise and the transmission of vibration is reduced. The pressure point is no longer displaced geometrically but rather by different pressure resistances, i.e., resilience, in the pressure-transferring surface. The pressure-applying unit applying the pressure distributed over the entire pressure surface can be placed at least in sections on the pressure-transferring surface. A continuous transition is attained in the pressure-transferring surface between the areas with lower and higher pressure resistance. Local peaks of stress are avoided, and the damping plates are stressed less locally which reduces wear. In addition, the angled position is reduced, and the piston or caliper is not lifted from damping plate, and the pressure point displacement can be adjusted more finely. In any case, the piston/caliper does not directly contact the base plate.

Preferred embodiments are found in the subclaims. Accordingly, the arrangement of beads not only increases the resilience in one area of the pressure-transferring surface, but it also increases the flexural strength of the damping plate. In addition, the damping plate is given an additional grip since bulges form on the edges of the contact surface when the pressure-applying unit deforms the beads by pressure, and the bulges help keep the pressure-applying unit in place.

It is also possible to set the different degrees of resilience by partially cutting out the are that is to have a lower resilience. with this embodiment, the entire pressure surface of the piston experiences contact from the beginning at least in sections. A number of variations are conceivable for the design and arrangement of the cut-outs.

The pressure-applying unit can completely contact the pressure-transferring surface when pressure is initially applied to the damping plate when the different degrees of resilience are created by materials with a differing pressure elasticity modulus.

It is also conceivable to create a sandwich damping plate that is composed of two individual damping plates, and the top damping plate facing the pressure-applying unit has cut-outs.

In one advantageous embodiment of the invention, there are elements only in selected areas of the pressure-applying surface that increase or reduce the average resilience of these areas, i.e., at least one area can be free of such elements.

It is particularly preferable for the same elements to be in the same area, and the areas are arranged according to increasing average resilience. The resilience hence increase continuously from the area of least resilience to the area of greatest resilience. The pressure point is displaced with a very effectively by avoiding a wave-like pattern of resilience.

BRIEF DESCRIPTION OF THE DRAWINGS

The invention will be further explained in the following with reference to the examples in the drawings:

FIGS. 2a, 2b, and 2c are sectional views taken along line 2—2 in FIG. 1 that shows a brake piston placed on and lifted from the damping plate;

FIGS. 3a, and 3b are sectional views taken along line 3—3 from FIG. 1 that shows two variations for bead paths;

FIG. 4 is a top view similar to FIG. 1 for second and third embodiments of bead paths;

FIGS. 5a, and 5b are sectional views taken along line 5—5 from FIG. 4 with two possible bead paths;

FIG. 8 is a top view similar to FIG. 1 of a first embodiment of a partial cut-out in the area with lower resilience;

FIG. 9 is a sectional view taken along line 9—9 from FIG. 8;

FIG. 10 is a top view similar to FIG. 8 of a second embodiment of a partial cut-out;

FIG. 11 is a sectional view taken along line 11—11 from FIG. 10;

FIG. 14 is a top view similar to FIG. 8 with a third embodiment for a partial cut-out;

FIGS. 15a, and 15b are sectional views taken along line 15—15 in FIG. 14 with two different cross-sections;

FIG. 17 is a sectional view of a damping plate according to the invention that is made of two metal plates.

DETAILED DESCRIPTION OF PREFERRED EMBODIMENTS

Figure 1:
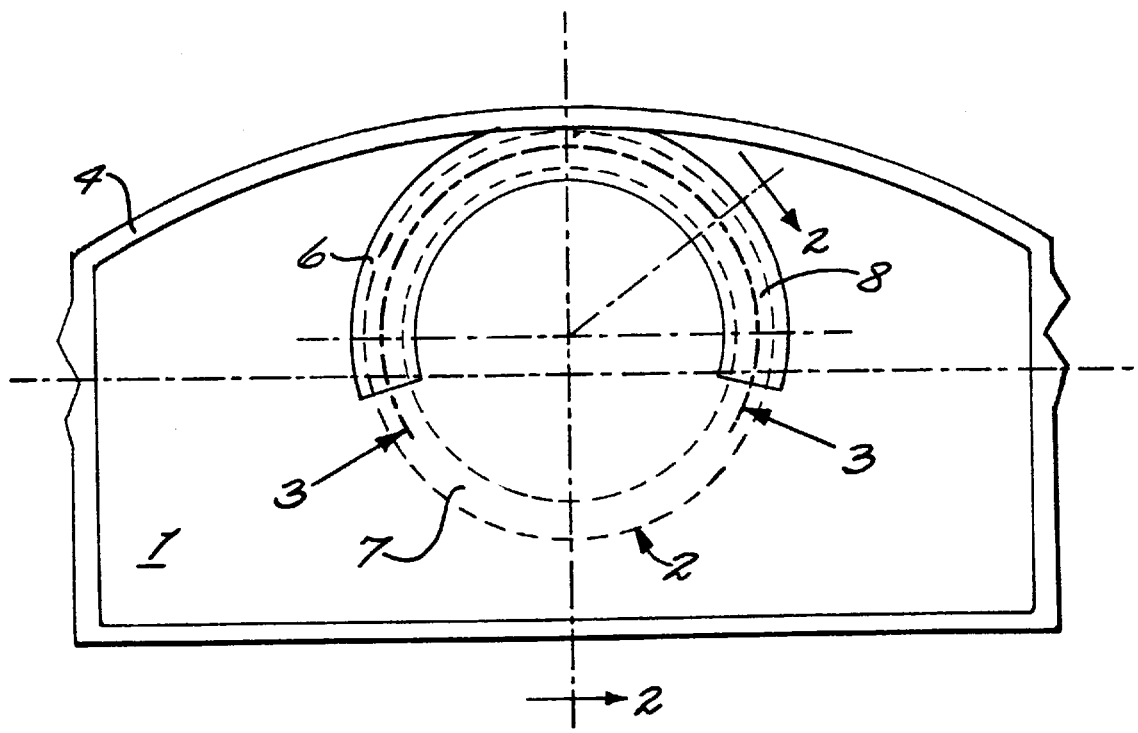
FIG. 1 is a top view of a damping plate according to the invention with a first embodiment of a bead in the pressure-transferring surface.

The exemplary embodiments in the figures show some of the possibilities for designing areas with different degrees of resilience in the pressure-transferring surface of a damping plate 1 according to the invention. The pressure-transferring surface 2 is annular in all examples, but it is also possible for the pressure-transferring device 2 to be a solid surface and the brake piston/caliper 3 to have complete contact. In addition, the shape of the pressure-transferring surface 2 is not limited to a circle; any suitable shape can be used such as a rectangle. It is important that the pressure surface of the brake piston/caliper 3 not extend beyond the outer edge of the damping plate 1 to avoid any geometric displacement of the pressure point.

The damping plates 1 are made of at least one metal plate and are preferably coated with rubber on at least one side. The pressure-transferring surface 2 can be on the rubber-coated side or on the other side.

As in the figures, the damping plate 1 is on a base plate 4; on the other side is the brake lining 5 that is on a brake disk (not shown).

In the embodiments in FIGS. 1–7, the areas with different degrees of resilience 6, 7 have raised beads to increase the resilience in one area of the pressure-transferring surface.

The bead 8 in FIG. 1 runs peripherally across a section of the annulus. The path of the bead 8 can vary in a peripheral direction as can be seen in FIGS. 3a and 3b. In FIG. 3a, the bead 8 runs to the end area 8a with a constant height while the bead height in FIG. 3b increases from one end 8a of the bead 8 toward the perimeter of the annulus to the middle of the bead 8b and decreases from there to the other end 8a.

FIGS. 2a, 2b and 2c show the deformation of the bead 8 under pressure by a pressure-applying unit 3, e.g. a brake piston. FIG. 2a shows the initial state before pressure is first applied where a brake piston 3 is at a distance above the pressure-transferring surface 2, and the bead 8 is completely undeformed. When pressure is applied to the piston 3, a section of its contact surface 9 contacts the top of the bead 8 and presses it downward with plastic and elastic deformation until its bottom rests on the base plate 4 at a set pressure. In this state, the entire contact surface 9 of the piston 3 lies on the pressure-transferring surface 2 of the damping plate (FIG. 2b). The piston 3 exerts greater pressure in the bead area 6 due to the partially elastic deformation of the bead 8 than in the area 7 of the pressure-transferring surface 2 that does not have a bead 8. The bead 8 forms a bulge 10 when it deforms at the radial inner and outer edge that borders the annular contact surface 9 of the brake piston 3 to the inside and outside, and the piston is held. When the brake piston 3 is released, it lifts from the damping plate 1, and the bead 8 returns from its elastic deformation (FIG. 2c).

FIGS. 4, 5a and 5b show a series of radial, peripherally adjacent beads 11. There can be clear spaces between the beads 11a as shown in the left half of FIG. 4. The beads 11b can also directly contact each other as shown in the right half of FIG. 4. The bead height can be constant or changing in the peripheral direction. For example, the height of the beads can be the same from the first to last bead (FIG. 5a) or increase from the end beads of the row to the middle of the row (FIG. 5b).

Figure 6:
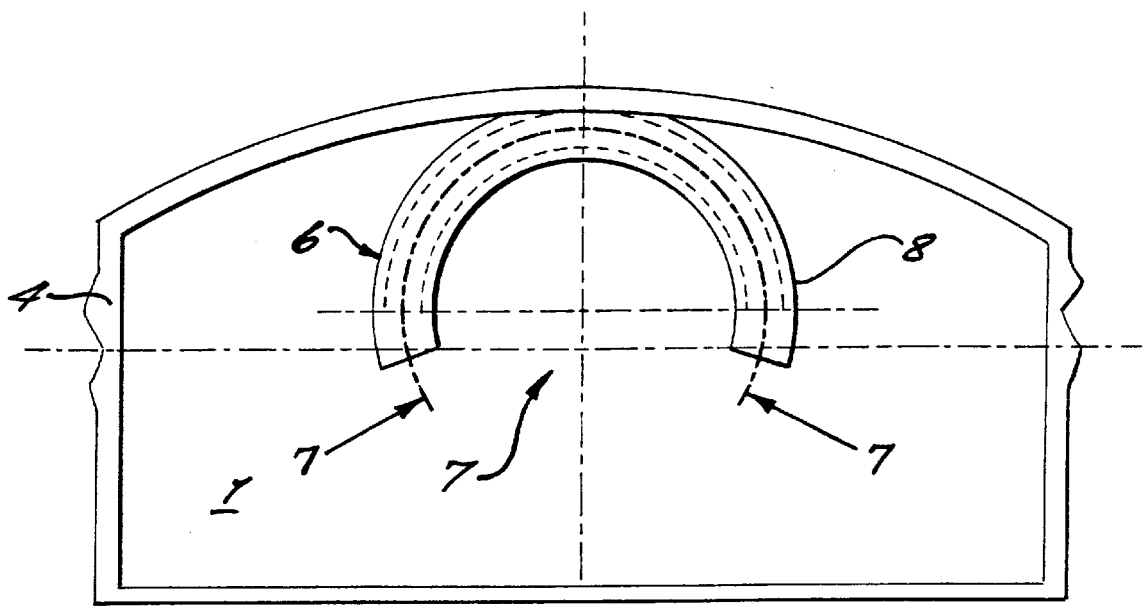
FIG. 6 is a top view similar to FIG. 1 with an elastic material under the bead.
Figure 7:
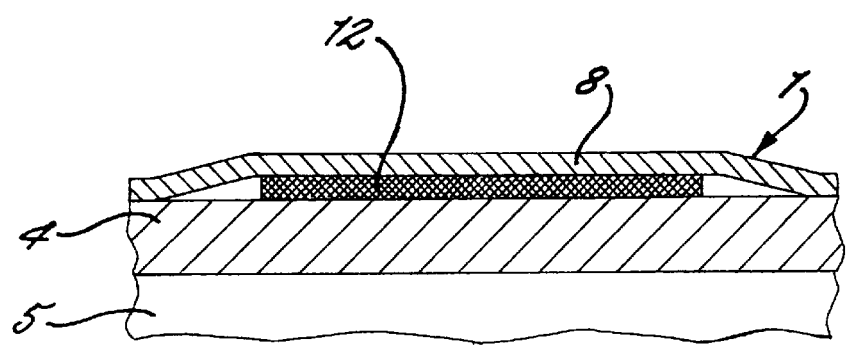
FIG. 7 is a sectional view taken along line 7—7 from FIG. 6.

To increase the resilience or elasticity, an elastic material 12 can be under the beads as shown in FIGS. 6 and 7 with the bead shape from FIG. 1.

The bead contour, e.g. height, width, radius, and the path or arc of the beads can be adapted to any requirements. The shape of the beads 8, 11 is not limited.

FIGS. 8–16 show exemplary embodiments in which the areas 6, 7 have different resilience at the pressure-transferring surface 2 because the resilience has been reduced by partially removing material. In this embodiment, the metal plate is preferably coated with rubber on at least one side to promote displacement of force. When there is only one side with a rubber coating, the rubber coating can be selectively provided on the pressure-transferring side or the other side.

In the exemplary embodiment in FIGS. 8 and 9, there is a radially interior cut-out 13a running in a peripheral direction and a radially exterior second cut-out 13b running in a peripheral direction. There is a strip of material 14 between the cut-outs that is contacted by the pressure-applying unit 3 (FIG. 9). The top of the strip of material 14 is flush with the top of the surface of the pressure-transferring surface 2 so that the piston 3 lies on a closed annular line on the pressure-transferring surface 2. The cut-outs 13 do not extend through the entire thickness of the damping plate 1.

FIGS. 10 and 11 shown an exemplary embodiment that has a cutout 15 running peripherally in the annular pressure-transferring surface that is radially in the middle of the annulus. There are radially exterior and interior material strips 16a, 16b on which the piston 3 lies. The piston 3 lies on a continuous annular line on the pressure-transferring surface 2 of the damping plate 1. In this example, the cut-out 15 penetrates the damping plate 1.

Figure 12:
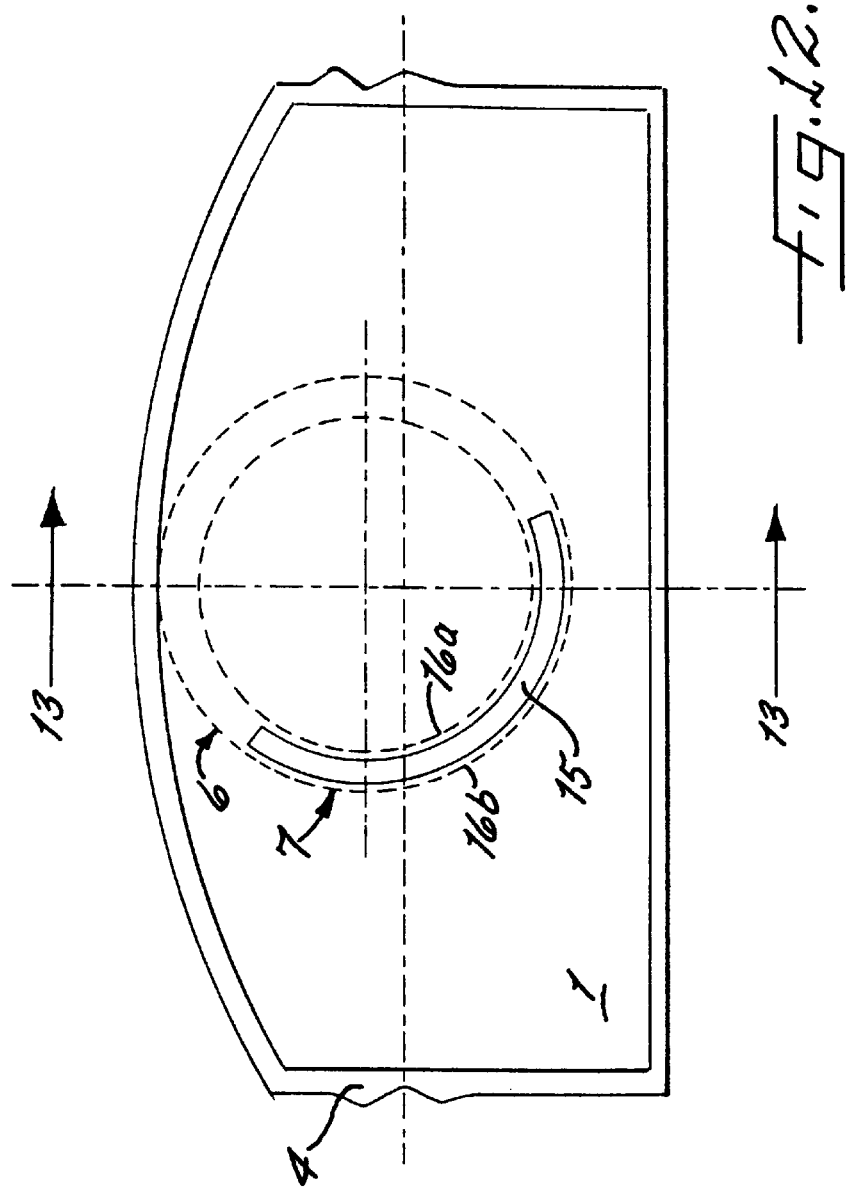
FIG. 12 is a top view similar to FIG. 8 with an asymmetrical arrangement of a partial cut-out.
Figure 13:
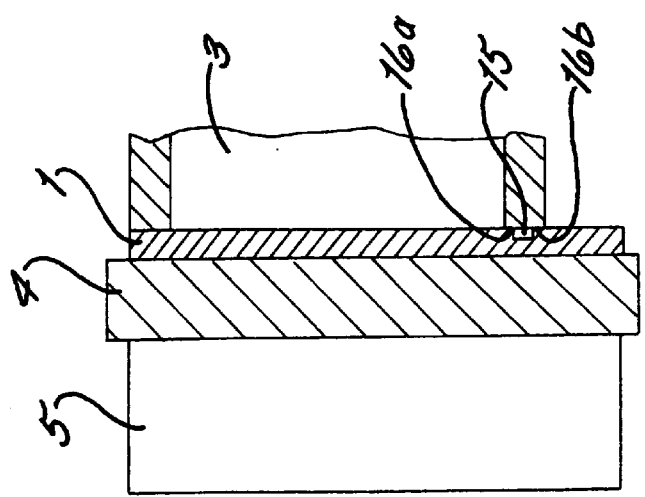
FIG. 13 is a sectional taken view along line 13—13 in FIG. 12.

FIGS. 12 and 13 refer to the partial cut-out 15 in FIG. 10 and show that the areas 6, 7 with the increasingly different resilience do not have to be symmetrical to the line of symmetry of the damping plate. The cut-outs (or beads) can be distributed on the pressure-transferring surface 2 in any suitable manner to precisely adjust the degree and direction of desired pressure point displacement.

The cut-outs can run radially as shown in FIG. 14, 15a and 15b. The cut-outs 17 are adjacent in a row running peripherally in relation to the annular section. There is a radial material strip 18 between two neighboring cut-outs. In this exemplary embodiment, the top of the strip 18 is flush with the top of the non-cut-out area of the pressure-transferring surface 2 so that a pressure-applying unit 3 contacts the pressure-transferring surface 2 at least in sections when pressure starts to be applied that is distributed across its entire pressure surface. As can be seen in FIGS. 15a and 15b and FIGS. 9, 11 and 13, the cut-outs can penetrate just one part of the thickness of the damping plate. They can also completely penetrate to form small passages in the damping plate 1.

When the cut-outs only extend partially through the thickness of the damping plate, they can also be on the side facing away from the pressure-applying unit.

Figure 16:
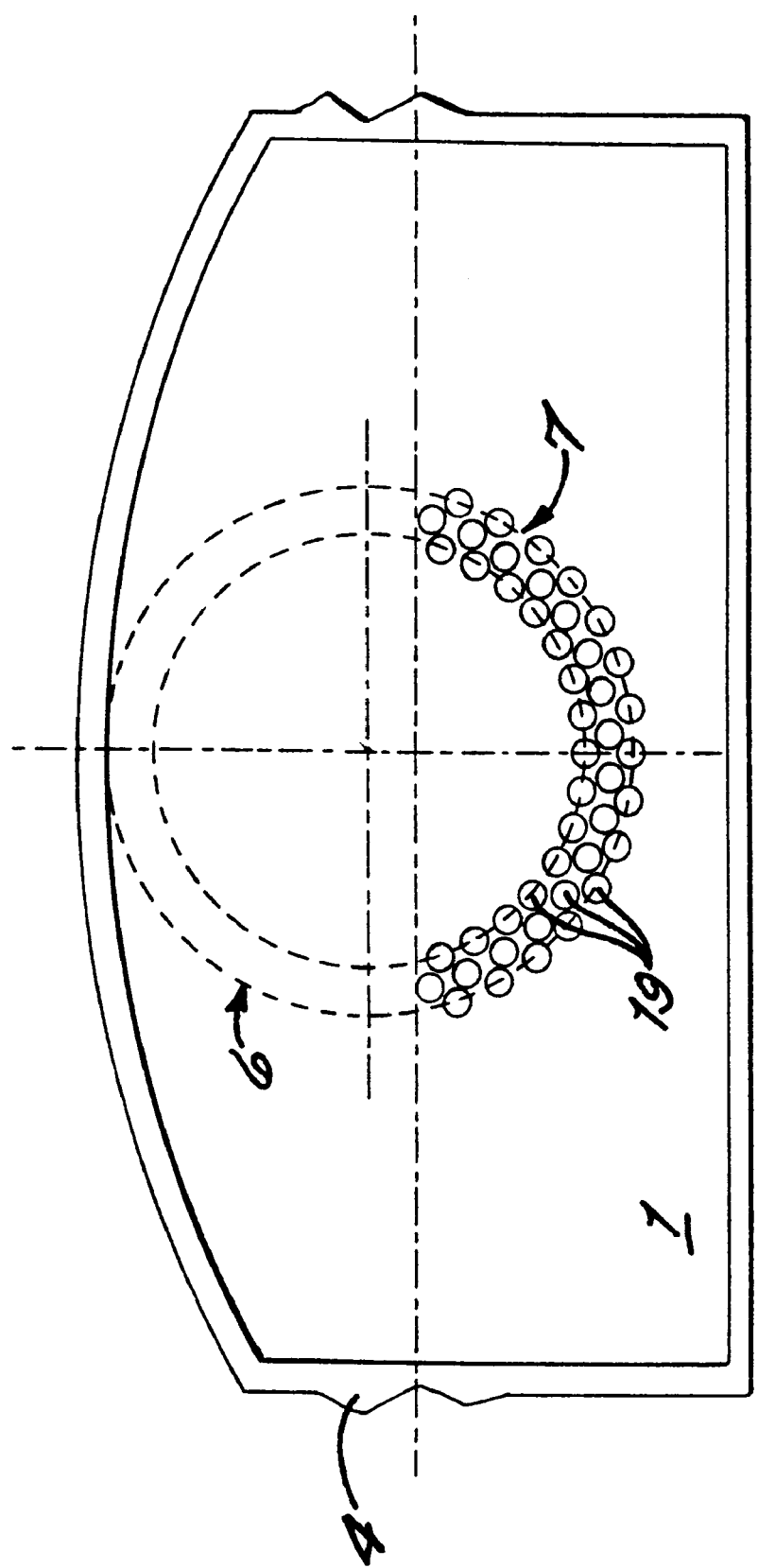
FIG. 16 is a top view similar to FIG. 8 with a fourth embodiment for a partial cut-out.

In another exemplary embodiment in FIG. 16, the partial cutout consists of several (three in the example) rows of radially adjacent circular cut-outs 19 running in a peripheral direction.

It can be seen that there are many possible designs and arrangements of beads and partial cut-outs that can be adapted to the respective requirements. For example, there can be sectors of partial cut-outs or beads instead of linear partial cut-outs or beads with the full surface of the pressure-application unit being applied. It is important that sections distributed across the entire pressure surface of the pressure-applying unit lie on the pressure-transferring surface of the damping plate at least starting at a certain pressure, and the pressure point displacement is controlled by suitably selecting the resilience.

In the embodiment in FIG. 17, the damping plate 1 consists of two sandwiched metal plates covered with rubber on both sides, i.e., of two individual damping plates 1a, 1b that are glued with each other and with the base plate 4. There are no partial cut-outs; there is a complete cut-out 20 in the top damping plate 1a facing the pressure-applying unit to form an area 7 with the lowest resilience. The thickness of the top metal plate 21 is substantially less than that of the bottom metal plate 22, and the deformability of the rubber layers 23 and the adhesive layer 24 between the two damping plates are such that the pressure-applying unit rests on the rubber coating of the bottom damping plate at a slight angle in the cut-out 20 and does not completely lift from the top damping plate 1a. Since the adhesive 24 is very elastic, it can contribute to the difference in resilience. This also helps the entire pressure-applying unit to rest at least in sections on the pressure-transferring surface of the overall damping plate 1. When pressure is initially applied, a section of the pressure surface of the pressure-applying unit only lies on the top damping plate 1a. The bottom plate 1b prevents the pressure-applying unit from contacting the base plate 4 and prevents stress peaks and wear.

That which is claimed:

1. A damping plate for vehicle brakes, the damping plate comprising:
    at least one plate of metal; and
    a pressure-transferring surface which transfers pressure applied thereto, the pressure-transferring surface having at least two areas with different degrees of resilience and being non-uniformly distributed, for offsetting the applied pressure and concurrently enabling a pressure-applying unit to apply pressure distributed over the entire pressure surface at least starting at a predetermined pressure, the pressure applying unit being placed at least in sections on the pressure-transferring surface at said predetermined pressure.

2. A damping plate according to claim 1, wherein the at least one metal plate is coated with rubber on at least one side.

3. A damping plate according to claim 2, wherein the pressure-transferring surface is on a side of the metal plate covered with rubber.

4. A damping plate according to claim 1, wherein the pressure-transferring surface has a substantially annular shape.

5. A damping plate according to claim 4, wherein the pressure-transferring surface includes an annular section forming an area with the greatest resilience, the area having a peripheral bead that is at least partially elastically deformed under the given pressure.

6. A damping plate according to claim 4, wherein the pressure applying surface includes an annular section forming an area with the greatest resilience the area having a plurality of radial, peripherally adjacent beads.

7. A damping plate according to claim 5, further comprising elastic material positioned to underlie the peripheral bead.

8. A damping plate according to claim 4, wherein the pressure-transferring surface is partially cut out in an annular section forming an area with the less resilience.

9. A damping plate according to claim 8 wherein the annular section forming the area with less resilience has a radially interior, peripheral cut-out and a radially exterior peripheral cut-out with a material strip positioned therebetween.

10. A damping plate according to claim 8 wherein the annular section forming the area with less resilience has a radially central, peripheral cut-out with a radially inner and radially outer material strip.

11. A damping plate according to claim 8 wherein the annular section forming the area with less resilience has cut-outs and material strips that alternate peripherally.

12. A damping plate according to claim 8 wherein the annular section forming the area with less resilience has a plurality of relatively small cut-outs that are arranged in radially inner, radially central, and radially outer rows which extend in a peripheral direction.

13. A damping plate according to claim 1, wherein the pressure-transferring surface is continuous, and the areas with differing resilience have a differing pressure elasticity modulus.

14. A damping plate according to claim 2, wherein the damping plate comprises a first damping plate, and further comprising a second damping plate positioned so that the first and second damping plates define a pair of sandwiched, bonded damping plates, and an area with less resilience is formed by a complete cut-out in the first damping plate facing the pressure from the pressure applying unit, whereby elastic deformation of the resilient areas of the first damping plate is such that the pressure-applying unit that initially contacts only the first damping plate also contacts the second damping plate at an angle thereto at the predetermined pressure.

15. A damping plate according to claim 1, wherein only selected areas of the pressure-transferring surface have elements that increase or reduce the average resilience of these areas.

16. A damping plate according to claim 15, wherein the same elements form a single area, and wherein a plurality of single areas are arranged according to increasing average resilience.

17. A damping plate according to claim 6, further comprising elastic material positioned to underlie the plurality of beads.

18. A damping plate system for vehicles, the system comprising:
   a damping plate having at least one plate of metal and a pressure-transferring surface which transfers pressure applied thereto, the pressure-transferring surface having at least two areas with different degrees of resilience and being non-uniformly distributed, for offsetting the applied pressure; and
   a pressure-applying unit positioned to apply pressure distributed over the entire pressure-transferring surface of the damping plate, at least starting at a predetermined pressure.

* * * * *

UNITED STATES PATENT AND TRADEMARK OFFICE
CERTIFICATE OF CORRECTION

PATENT NO.   : 6,193,024B1
DATED        : February 27, 2001
INVENTOR(S)  : Heppes et al.

It is certified that error appears in the above-identified patent and that said Letters Patent is hereby corrected as shown below:

Column 2,
Line 26, delete "are" and insert -- area -- therefor.
Line 27, delete "with" and insert -- With -- therefor.
Line 46, after "hence", delete "increase" and insert -- increases -- therefor.

Column 3,
Line 21, delete "taken view" and insert -- view taken -- therefor.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*